Figure 1:
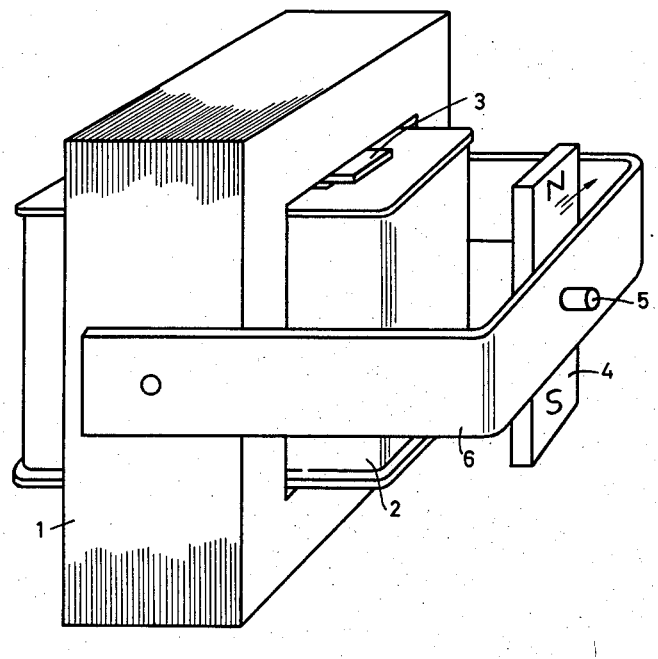

July 19, 1960     F. KUHRT     2,945,993
COMPENSATED HALL VOLTAGE GENERATOR

Filed April 15, 1959     2 Sheets-Sheet 1

July 19, 1960     F. KUHRT     2,945,993
COMPENSATED HALL VOLTAGE GENERATOR

Filed April 15, 1959     2 Sheets-Sheet 2

United States Patent Office

2,945,993
Patented July 19, 1960

2,945,993

COMPENSATED HALL VOLTAGE GENERATOR

Friedrich Kuhrt, Nurnberg, Germany, assignor to Siemens-Schuckertwerke Aktiengesellschaft, Berlin-Siemensstadt, Germany, a corporation of Germany Filed Apr. 15, 1959, Ser. No. 806,697

Claims priority, application Germany Apr. 22, 1958

4 Claims. (Cl. 317—234)

My invention relates to Hall voltage generating devices and, in a more particular aspect, to Hall voltage generators for use as multiplier or modulator.

Such devices, known for example from my Patents No. 2,184,015, No. 2,825,858 and No. 2,862,189, comprise a semiconductor wafer, the so-called Hall plate, which has two terminals for passing a direct or alternating control current through the plate, and two probe electrodes, the so-called Hall electrodes, which are located intermediate the respective terminals and are spaced from each other in a direction normal to that of the current flow. The plate is subjected to a magnetic field in a gap of a core structure magnetizable by means of an excitation winding to which a direct or alternating excitation current is supplied. When either the control current or the excitation current is zero, the two Hall electrodes are supposed to be located on equipotential points so that no voltage appears between them. When both the control current and the excitation current have respective finite values, a voltage appears between the two Hall electrodes. This "Hall voltage" is equal to the product of the two electric currents or of two other electric magnitudes upon which these respective currents are dependent. Such a device therefore, is applicable as a multiplier to provide across its Hall electrodes a voltage proportional to the product of the respective input magnitudes that supply or control the control current and the excitation current respectively. When one of the two currents is alternating, the device operates as a modulator. Devices of this kind are highly sensitive and accurate so that they are also useful for measuring purposes, for example, to effect a modulation or translation of measuring values.

The accuracy of such devices, however, is generally affected by the fact that, due to magnetic remanescence, manufacturing tolerances or slight inaccuracies, the Hall voltage is not strictly zero when one or both of the above-mentioned currents are zero. The residual component (null component) of Hall voltage is negligible for some purposes but under unfavorable condition may attain the order of magnitude of 100 microvolts. This occurrence of a voltage under zero conditions is detrimental when using Hall generators and multiplier circuits of high accuracy or for the above-mentioned measuring purposes.

It is an object of my invention to eliminate the above-mentioned shortcoming and to provide for zero compensation of extreme constancy. Another correlated object is to secure such a zero compensation with the aid of static means of utmost simplicity, and to permit adjusting or calibrating the compensation from the outside of the device at any desired time.

To achieve these objects, and in accordance with my invention, I provide the Hall generating device with a permanent magnet which is adjustable as regards its spacial relation to the magnetizable core structure in order to minimize or fully compensate the zero component of the Hall voltage. The permanent magnet may be fastened to a bracket or a stirrup shaped holder of nonmagnetic material such as brass. A Hall voltage generator according to the invention has the advantage of extreme constancy of compensation and permits calibrating the device at any time exactly down to the minimum or vanishing point of the zero component simply by displacing or changing the rotary position of the permanent magnet, and this can be done by manipulation from the outside of the generating device.

According to a more specific feature of the invention, the permanent magnet is provided with a pivot shaft which is accessible from the outside and permits turning or tilting the magnet relative to the core structure.

Figure 2:
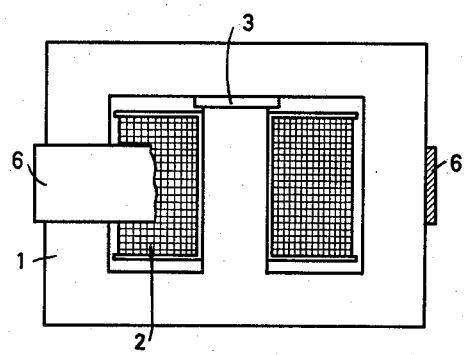
Figure 3:
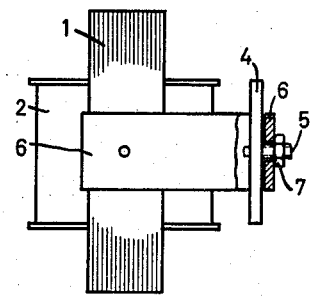
Figure 4:
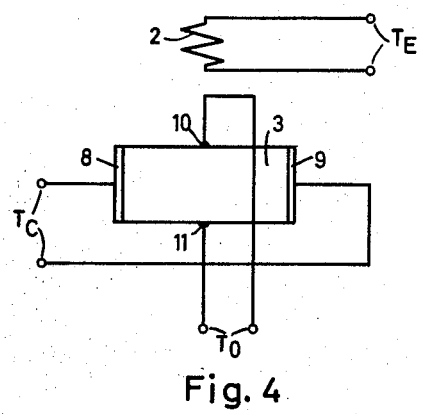

An embodiment of a Hall generator according to the invention is illustrated by way of example on the accompanying drawing, in which Fig. 1 shows a perspective view of the device,
Fig. 2 is a part-sectional front view,
Fig. 3 is a part-sectional side view, and
Fig. 4 is a schematic circuit diagram relating to the same device.

The illustrated device is provided with a magnetizable core 1 which carries a winding 2 for producing a magnetic field in a narrow gap of the core structure in which a semiconducting Hall plate 3 is located. The core structure 1 is shown composed of sheet metal laminations. It may also consist of ferrite or similar magnetizable material. Ferromagnetic substances of high permeability, for example the so-called Mu-metal are likewise applicable, the choice of the core material being preferably made in accordance with the type of excitation (alternating current or direct current) and the frequency of any periodic variations of the control or excitation current that are to be translated by the device. The Hall plate 3 consists of a small rectangular wafer preferably made of a semiconductor compound whose carrier mobility is above 6000 c.$^2$/volt second. Hall plates of indium antimonide and indium arsenide are particularly well suitable.

For compensating or minimizing the null component of the Hall voltage, a permanent magnet 4 is mounted on a pin 5 which is secured to a bracket 6 of brass attached to the core 1. The pin 5 is in threaded engagement with a bore of the bracket 6 and is secured in proper position by means of a nut 7. After loosening the nut 7, the magnet 4 can be turned to any rotary position required for minimizing or eliminating the zero component.

The Hall plate 3 is provided with terminal electrodes 8 and 9 connected to respective current-supply terminals $T_C$. Two Hall electrodes 10 and 11 are connected with respective output terminals $T_O$. The field coil 2 is connected to terminals $T_E$ for supplying excitation current.

When direct current is supplied through terminals $T_C$ and $T_E$, the Hall voltage across the output terminals $T_O$ is proportional to the product of both currents except that, as mentioned, a slight error voltage may remain across terminals $T_O$ when one of the two currents is zero. When the device is used for measuring purposes, it may be desired to pass a slowly varying unidirectional current through the terminals $T_E$ and to pass through the terminals $T_C$ an alternating current of a given fixed modulating frequency, in which case the output voltage at terminals $T_O$ exhibits the current variations to be measured or transmitted as a modulation imposed upon the carrier frequency applied to terminals $T_C$. In this case, too, an error voltage or unwanted modulation may be exhibited under conditions where the modulating input signal is zero. Such residual error voltages are eliminated or controlled in any desired sense by the proper adjustment of the permanent magnet 4. The adjustment can readily be made after the device is installed and tested under conditions of actual use.

It will be obvious to those skilled in the art that with respect to the location, mounting and adjusting of the compensating magnet, my invention permits of various modifications and hence may be embodied in devices other than particularly illustrated and described herein, without departing from the essential features of my invention and within the scope of the claims annexed hereto.

I claim:

1. A Hall voltage generator for use as multiplier particularly modulator, comprising a magnetizable core structure having a field gap, a field winding on said structure for controlling the magnetic-field in said gap, a Hall plate disposed in said gap and having current supply terminals and Hall electrodes to provide an output voltage proportional to the product of the field excitation of said structure and the current in said plate, a rigid holder of non-magnetic material secured to said structure, a permanent magnet mounted on said holder in spaced relation to said structure and positionally adjustable relative thereto for compensating the null component of said output voltage.

2. A Hall voltage generator for use as multiplier particularly modulator, comprising a magnetizable core structure having a field gap, a Hall plate disposed in said gap and having current supply terminals and Hall electrodes to provide an output voltage proportional to the product of the field excitation of said structure and the current in said plate, a rigid holder of non-magnetic material secured to said structure, a permanent magnet pivotally mounted on said holder in spaced relation to said structure and rotatably adjustable relative thereto for compensating the null component of said output voltage.

3. A Hall voltage generator for use as multiplier particularly modulator, comprising a magnetizable core structure having a field gap, a Hall plate disposed in said gap and having current supply terminals and Hall electrodes to provide an output voltage proportional to the product of the field excitation of said structure and the current in said plate, a device for compensating the null component of said output voltage, said device having a permanent magnet positionally adjustable relative to said core structure and being accessible for adjustment of said magnet from the outside of the generator.

4. In a Hall voltage generator according to claim 2, said permanent magnet having a pivot axis at a right angle to the field axis of said gap and having a pole axis in a plane substantially parallel to said field axis.

References Cited in the file of this patent

UNITED STATES PATENTS 1,825,855    Craig ------------------ Oct. 6, 1931